United States Patent Office 2,902,478
Patented Sept. 1, 1959

2,902,478
OXYALKYLATION OF SOLID POLYOLS

Arthur W. Anderson, Midland, Mich., assignor to The Dow Chemical Company, Midland, Mich., a corporation of Delaware No Drawing. Application May 9, 1957
Serial No. 658,020

14 Claims. (Cl. 260—209)

This invention relates to processes for the oxyalkylation of high-melting polyhydroxy compounds.

The conventional processes for the oxyalkylation of solids involve either fusing the solid or dissolving it in a suitable solvent. Heat-sensitive compounds having relatively high melting points, such as sugars and pentaerythritol, are damaged and discolored by being heated at their melting points. The use of solvents is objectionable because of the added expense of a solvent recovery system. In some cases the alkylene oxide used as a reactant can also serve as a solvent but in most cases the polyol is substantially insoluble in alkylene oxides. In fact, no practical solvent is known that will simultaneously dissolve these polyols, the alkylene oxides and the conventional caustic alkali catalysts without entering into reaction with the oxide. Because of these difficulties, no practical process has hitherto been available for the oxyalkylation of high-melting polyols that are substantially insoluble in alkylene oxides without the simultaneous formation of by-products.

An object of this invention is to provide processes for the oxyalkylation of high-melting polyols at temperatures substantially below the melting points of the polyols and in the absence of a solvent other than the alkylene oxide reactant, whereby at least one mole of alkylene oxide reacts with each hydroxyl group of the polyol and liquid products are formed. Another object is to provide liquid oxyalkylated derivatives of high-melting polyols free of inorganic impurities, substantially free of any organic by-products, and of discoloration and decomposition products formed when the polyols are heated above the temperature range in which they are stable.

According to the invention, high-melting, heat-sensitive polyols that are substantially insoluble in alkylene oxides are oxyalkylated at temperatures below their melting points and decomposition temperatures and in the absence of solvent by the use of trimethylamine as a catalyst. It has been discovered that trimethylamine not only catalyzes the reaction of alkylene oxides with hydroxyl compounds but it also solvates or otherwise activates solid polyols so that they readily react with alkylene oxides at temperatures as low as 80° C.

I have observed that other lower alkyl tertiary amines, specifically triethyl- and tripropylamine, have a somewhat similar catalytic effect in that they effectively catalyze the reaction of propylene oxide with polyols. In such reactions, however, these particular amines produce a peculiar effect; namely, they catalyze the reaction of one, and only one mole of propylene oxide with each hydroxyl group of the polyol. Such an effect has not been observed with other catalysts, including trimethylamine, or other alkylene oxides. This particular discovery is disclosed and claimed in my copending application entitled "Hydroxypropylation of Hydroxy Compounds," filed December 24, 1956, Serial No. 630,067.

The term "high-melting heat-sensitive polyol" as used herein means solid compounds which contain at least 4 alcoholic hydroxyl groups, which melt above about 120° C. and which suffer discoloration or other damage from prolonged heating at or about their melting points. Since the heat stability of organic compounds depends not only on their structure but also on their purity, exposure to air or light, contact with metals and the like, it is intended to include in the above definition those compounds which show heat damage when the commercial grade of material is melted in common metal equipment without precautions to exclude air or light. Commercially important examples of polyols included in the invention include the heat-sensitive sugars, such as sucrose; polymethylols, such as pentaerythritol, dipentaerythritol and tripentaerythritol and the like and mixtures of any of the above materials.

The alkylene oxides useful in the invention are the vicinal oxides; that is, those in which the oxide oxygen atom (oxirane oxygen) is attached to two adjacent aliphatic carbon atoms. The alkylene group of the alkylene oxide may bear a phenyl group as a substituent. Suitable oxides include ethylene oxide, 1,2-propylene oxide, 1,2- and 2,3-butylene oxides, isobutylene oxide, butadiene monoxide, styrene oxide, and the like and mixtures thereof.

The amount of trimethylamine used as catalyst is not critical. As little as a few hundredths of one percent, based on polyol, is frequently effective, though it is usually preferred to use at least about 0.1 percent. On the other hand, there is no advantage in using amounts greater than about 5 percent. The preferred range is about 0.1 to 2 percent, depending somewhat on the reactivity of the oxide, the reaction temperature, and the polyol used.

In general it is preferred to conduct the reaction at the lowest practical temperature, it being recognized that longer reaction times are required at lower temperatures. When a highly reactive oxide, such as ethylene oxide, is being used, a satisfactory rate of reaction frequently can be obtained at 80 to 90° C. while with more sluggish oxides, such as styrene oxide, somewhat higher temperatures may be required.

While the entire charge of polyol, alkylene oxide and trimethylamine may be mixed before reaction is initiated, this may result in undesirably vigorous reaction and poor temperature control, especially when ethylene oxide is being used. A preferred procedure comprises mixing the polyol, the catalyst and a small portion of the alkylene oxide, heating the mixture to reaction temperature, and then, when the reaction has begun, feeding in the remaining oxide at about the rate at which it reacts, thus permitting a steady rate of reaction and effective temperature control.

As is usual in oxyalkylation processes, it is desirable to exclude water and oxygen during the reaction period and to use reagents free of moisture, aldehydes and other interfering substances.

The practice of the invention is illustrated by the following examples:

Example 1.—Oxypropylation of sucrose

A pressure reactor was loaded with 2400 grams of sucrose, 3600 grams of propylene oxide and 21 grams of trimethylamine. It was then closed, flushed with nitrogen, and heated to 100° C. with constant stirring. A very vigorous reaction then began which required effective cooling to control the temperature.

After 2.25 hours the reaction substantially ceased, the pressure being zero (gauge). The product was a sirupy, water-soluble liquid. Based on the yield of 5925 grams, it contained 8.66 oxypropylene groups per sucrose molecule.

Example 2.—Oxypropylation of sucrose

When the procedure of Example 1 was repeated except that a 10:1 molar ratio of propylene oxide to sucrose and a temperature of 80–90° C. were used, substantially all the oxide reacted in 10 hours and the sirupy product was estimated to contain 9.5 oxypropylene groups per sucrose molecule.

Example 3.—Oxybutylation of pentaerythritol

A pressure reactor was loaded with 272 grams of pentaerythritol, 864 grams of a mixture of 1,2- and 2,3-butylene oxides, the 1,2-isomer being the predominant component, and 11.3 grams of trimethylamine. The reactor was closed, flushed with nitrogen and then heated to 100° C., with stirring. A vigorous reaction ensued and the temperature rose to 115°, despite external cooling. After the reaction subsided, heat was applied to maintain a temperature of 105° until a total reaction time of 3.3 hours had elapsed. The pressure had then dropped from a maximum of 43 p.s.i.g. to 9 p.s.i.g.

The unreacted butylene oxide was removed by application of vacuum, thus leaving the product as a sirupy, amber liquid, substantially insoluble in water and containing 5.06 oxybutylene groups per pentaerythritol molecule.

Dipentaerythritol and tripentaerythritol, corresponding to the formula

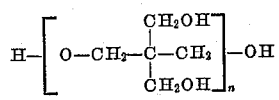

wherein $n$ is 2 or 3, may be substituted for pentaerythritol in the above example with substantially equivalent results.

Example 4.—Oxyphenethylation of sucrose

A pressure reactor was charged with 342 grams (1 mole) of sucrose, 960 grams (8 moles) of styrene oxide and 13 grams of trimethylamine. It was then heated for 1.9 hours at 118–122° C. and for 8.6 hours at 147°–151° C.

After being vacuum stripped of volatiles, a brown viscous liquid product remained which contained an average of 9.5 oxyphenethyl groups per sucrose molecule.

Example 5.—Oxyethylation of sucrose

In a suitable reactor, 1368 grams (4 moles) of sucrose, 14.9 grams of trimethylamine and 300 grams of ethylene oxide were heated to 100° C. The exothermic reaction raised the temperature to 133° and the pressure to 155 p.s.i.g. Thereafter the temperature was maintained at 90–105° and ethylene oxide was added at a rate sufficient to maintain the pressure at 30–75 p.s.i.g. When a total of about 900 grams of ethylene oxide had been added, the reactor was cooled, evacuated to remove volatiles, and emptied. The product was a very viscous brown sirup containing 20.25 oxyethylene groups per sucrose molecule.

Example 6

A 1263 gram portion of the product of Example 5 was returned to the reactor. Four grams of trimethylamine were added, the temperature was raised to 110–130° and the addition of ethylene oxide was continued until a product containing 81 oxyethylene groups per sucrose molecule was obtained. It was a water-miscible brown sirup which unexpectedly had much lower viscosity than did the product of Example 5.

The ethers of the invention are generally useful as thickeners and hydraulic fluids and as softeners and plasticizers for paper, cellophane and cellulose-based plastics. They are particularly useful as intermediates, since they may be incorporated into alkyd or polyurethane resins or they may be esterified with fatty acids or etherified with polyoxyalkylene glycols to form detergents, emulsifying agents, wetting agents, antifoamers and related surfactants.

I claim:

1. A process for oxyalkylating a high-melting heat-sensitive polyol comprising contacting the polyol containing 4 to 8 hydroxyl groups per molecule with at least a stoichiometric amount, based on the hydroxyl content of the polyol, of at least one vicinal alkylene oxide in the presence of a catalytic amount of trimethylamine and at a temperature above about 80° C. but below the normal melting point of the polyol, whereby substantially each hydroxyl group of the polyol is oxyalkylated and a liquid polyoxyalkylene ether is produced.

2. A process as defined in claim 1 wherein the polyol is a sugar.

3. A process as defined in claim 2 wherein the sugar is a disaccharide.

4. A process as defined in claim 3 wherein the disaccharide is sucrose.

5. A process as defined in claim 1 wherein the polyol has the formula

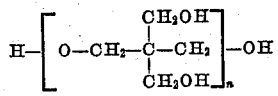

wherein $n$ is an integer from 1 to 3.

6. A process as defined in claim 5 wherein the polyol is pentaerythritol.

7. A process as defined in claim 6 wherein the polyol is diapentaerythritol.

8. A process as defined in claim 1 wherein the alkylene oxide is ethylene oxide.

9. A process as defined in claim 1 wherein the alkylene oxide is propylene oxide.

10. A process as defined in claim 1 wherein the alkylene oxide is a butylene oxide.

11. A process as defined in claim 1 wherein the alkylene oxide is 1,2-butylene oxide.

12. A process as defined in claim 1 wherein the alkylene oxide is 2,3-butylene oxide.

13. A process as defined in claim 1 wherein the alkylene oxide is styrene oxide.

14. A process for oxyethylating sucrose comprising contacting solid sucrose with at least 8 molar equivalents of ethylene oxide in the presence of a catalytic amount of trimethylamine at a temperature of about 80 to 150° C. and a pressure sufficient to maintain the ethylene oxide in the liquid state until substantially every hydroxyl group of the sucrose has been oxyalkylated.

References Cited in the file of this patent

UNITED STATES PATENTS

| | | |
|---|---|---|
| 1,863,208 | Schorger | June 14, 1932 |
| 2,552,528 | De Groote | May 15, 1951 |
| 2,562,884 | Barham | Aug. 7, 1951 |
| 2,733,238 | Kerr et al. | Jan. 31, 1956 |